(12) United States Patent
Nishioka et al.

(10) Patent No.: US 8,067,725 B2
(45) Date of Patent: Nov. 29, 2011

(54) DEVICE AND METHOD FOR DISPLAYING IMAGE

(75) Inventors: Ken Nishioka, Daito (JP); Atsuya Hirano, Daito (JP); Seiji Takemoto, Daito (JP); Atsuhiko Chikaoka, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 346 days.

(21) Appl. No.: 12/485,614

(22) Filed: Jun. 16, 2009

(65) Prior Publication Data
US 2010/0006741 A1 Jan. 14, 2010

(30) Foreign Application Priority Data
Jul. 10, 2008 (JP) ................................. 2008-180347

(51) Int. Cl.
*G01D 1/20* (2006.01)
(52) U.S. Cl. ........ 250/234; 250/205; 345/178; 345/207; 348/745
(58) Field of Classification Search .................. 250/205, 250/206, 234, 235; 345/84, 178, 204, 207, 345/690; 359/298; 348/744, 745
See application file for complete search history.

(56) References Cited

U.S. PATENT DOCUMENTS

| | | | |
|---|---|---|---|
| 4,684,996 A | 8/1987 | Baumeister | |
| 7,193,662 B2 * | 3/2007 | Childers | 348/745 |
| 2006/0261262 A1 | 11/2006 | Goto | |
| 2007/0012875 A1 | 1/2007 | Miyazawa | |
| 2010/0006741 A1 * | 1/2010 | Nishioka et al. | 250/201.1 |

FOREIGN PATENT DOCUMENTS

| | | |
|---|---|---|
| EP | 1275998 A1 | 1/2003 |
| EP | 2061258 A2 | 5/2009 |
| JP | 6-342126 | 12/1994 |
| JP | 2002-244206 | 8/2002 |
| JP | 2004-184852 | 7/2004 |
| JP | 2005-236650 | 9/2005 |
| JP | 2007-65012 | 3/2007 |

OTHER PUBLICATIONS

Patent Abstracts of Japan for Japanese Publication No. 06-342126, Publication date Dec. 13, 1994 (1 page).
Patent Abstracts of Japan for Japanese Publication No. 2004-184852, Publication date Jul. 2, 2004 (1 page).

(Continued)

*Primary Examiner* — Kevin Pyo
(74) *Attorney, Agent, or Firm* — Osha Liang LLP

(57) ABSTRACT

A deviation of an optic axis of a laser projector is detected, and the deviation is corrected. Laser projector's CPU executes: commanding a laser beam source of one color, out of laser beam sources of three colors, to emit a laser beam; shutting off the laser when sensing that the laser beam is received in a light-receiving region; applying a laser of a color to be detected as to the presence or absence of a deviation of the axis until its reception in the light-receiving region is sensed; keeping time starting when light reception in the light-receiving region is sensed and ending when light reception in a light-receiving region adjacent thereto is sensed; calculating a relative time difference of each of the colors with respect to a reference color; and correcting a light emission timing of the laser beam source of each of the color, based on the calculated time.

16 Claims, 8 Drawing Sheets

OTHER PUBLICATIONS

Patent Abstracts of Japan for Japanese Publication No. 2007-065012, Publication date Mar. 15, 2007 (1 page).
Patent Abstracts of Japan for Japanese Publication No. 2005-236650, Publication date Sep. 2, 2005 (1 page).
Patent Abstracts of Japan for Japanese Publication No. 2002-244206, Publication date Aug. 30, 2002 (1 page).
Extended European Search Report for Application No. 09164295.9-2202, mailed on Nov. 6, 2009 (7 pages).

* cited by examiner

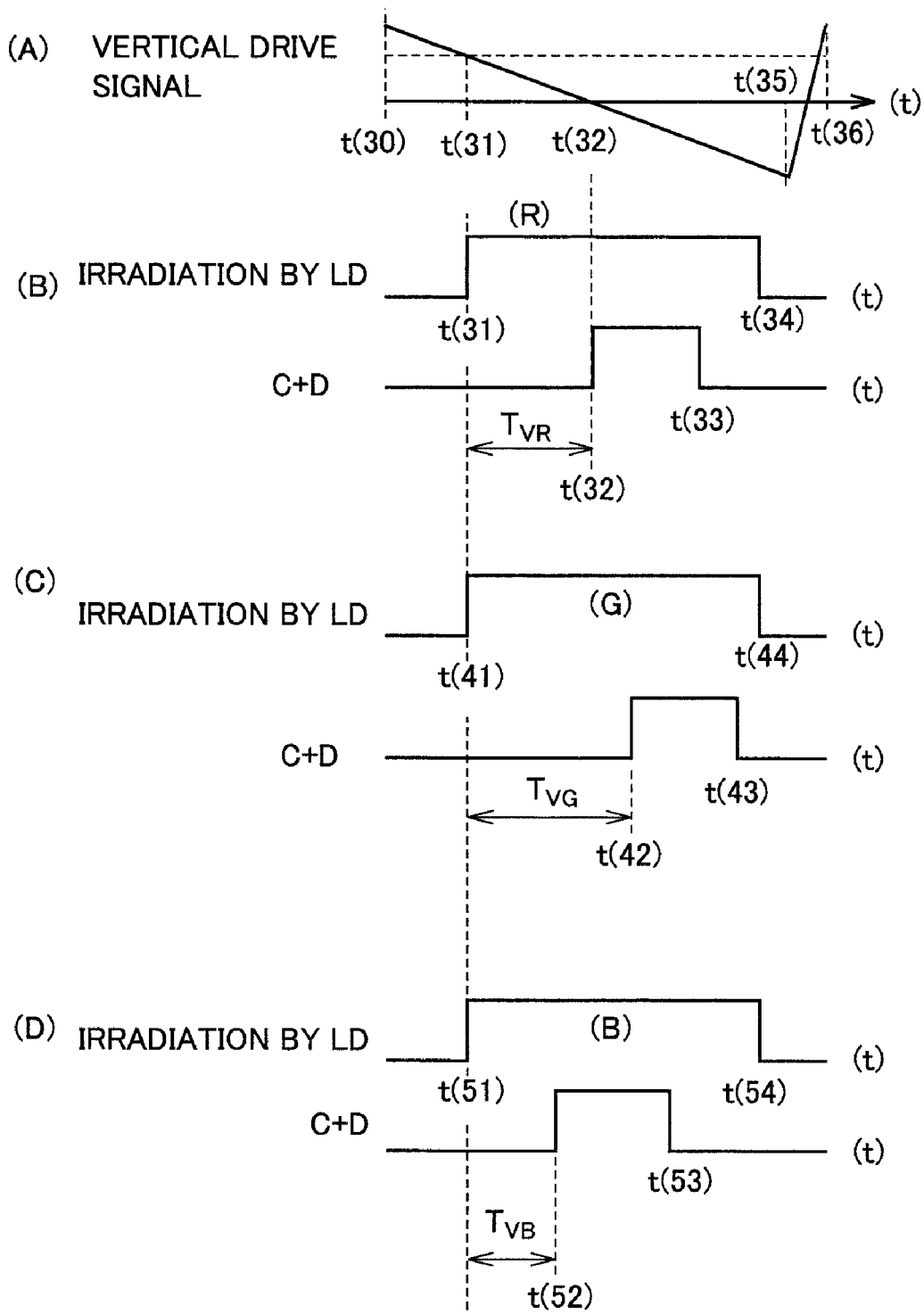

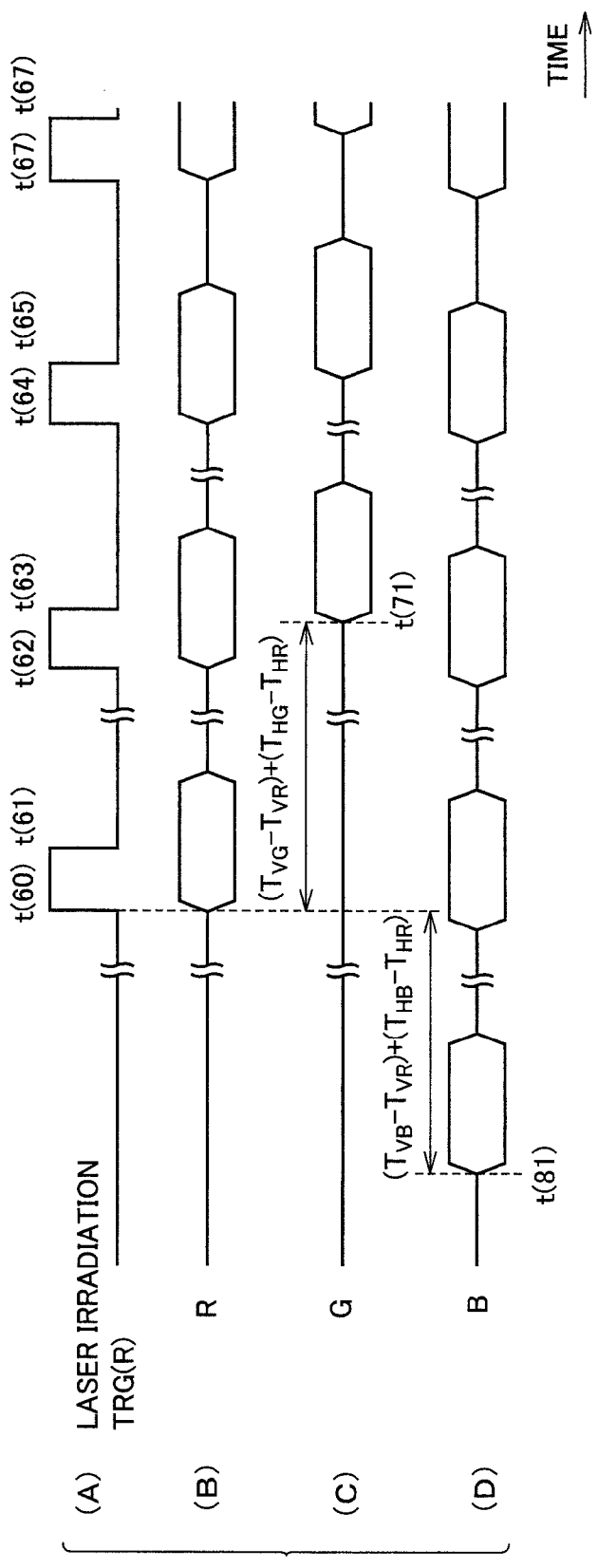

DEVICE AND METHOD FOR DISPLAYING IMAGE

BACKGROUND OF THE INVENTION

1. Field of the Invention

The present invention relates to control of an image display device, and particularly relates to control of an image display device having a plurality of light sources.

2. Description of the Background Art

As to image display devices such as laser projectors, Japanese Patent Laying-Open No. 06-342126, for example, discloses "a projection display device, more specifically, a projection display device in which an optical signal emitted from an optical shutter array having multiple optical shutter elements arranged in a one-dimensional manner, based on image data, is scanned with a deflection mirror to project a two-dimensional image" (Paragraph 0001).

Japanese Patent Laying-Open No. 2004-184852 discloses a technique for "adjusting a color balance including a white balance in a display device enabling white display with use of light from RGB light emitters" ("Problems to be Solved" in "Abstract").

Japanese Patent Laying-Open No. 2007-065012 discloses "a projection display device capable of maintaining an optimal white balance of a displayed image and obtaining high image quality even if quantities of light of a plurality of colors in light-emitting elements of the relevant colors are changed owing to degradation or failure of the light-emitting elements" ("Problems to be Solved" in "Abstract").

Japanese Patent Laying-Open No. 2005-236650 discloses "a projector capable of quickly and easily creating a color correction table for projecting an easily-viewable image of a desired color onto a screen" ("Problems to be Solved" in "Abstract").

Japanese Patent Laying-Open No. 2002-244206 discloses "a system for adjusting a position of a light modulation device, even capable of addressing a decrease in illumination margin associated with downsizing of a projector" ("Problems to be Solved" in "Abstract").

In a so-called beam-scanning display device such as a laser projector, if optic axes of RGB (Red, Green, Blue) do not coincide with one another, colors to be projected cannot be reproduced accurately. Therefore, precise adjustment for allowing the optic axes to coincide with one another, and accordingly, an ability to easily adjust the optic axes are demanded. Furthermore, an ability to add a function of adjusting the optic axes without increasing the number of components is also demanded.

SUMMARY OF THE INVENTION

In brief, according to an embodiment, a device for displaying an image is provided. The device includes: a first light source for emitting first light; and a second light source for emitting second light. A color of the first light differs from a color of the second light. The device further includes: a mirror for reflecting the first light and the second light; an actuator configured to drive the mirror in a scan direction; and a photoreceptor for receiving the first light and the second light. The photoreceptor includes a first light-receiving region and a second light-receiving region. A boundary between the first light-receiving region and the second light-receiving region is orthogonal to the scan direction. The device further includes: a controller configured to control light emission and shut off of the first light source, and light emission and shutoff of the second light source; a detector configured to detect a deviation between an optic axis of the first light source and an optic axis of the second light source, based on a timing at which the first light is received in the second light-receiving region and a timing at which the second light is received in the second light-receiving region; and a corrector configured to correct a light emission timing of the second light source based on the deviation detected by the detector.

In accordance with another embodiment, a method for displaying an image is provided. The method includes the steps of: emitting first light; and emitting second light. A color of the first light differs from a color of the second light. The method further includes the steps of reflecting the first light and the second light at a mirror; driving the mirror in a scan direction; and receiving the first light and the second light. A region for receiving includes a first light-receiving region and a second light-receiving region. A boundary between the first light-receiving region and the second light-receiving region is orthogonal to the scan direction. The method further includes the steps of: controlling light emission and shut off of the first light, and light emission and shut off of the second light; detecting a deviation between an optic axis of the first light and an optic axis of the second light, based on a timing at which the first light is received in the second light-receiving region and a timing at which the second light is received in the second light-receiving region; and correcting a light emission timing of the second light based on the detected deviation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram that represents the relation between drive of scanner mirror 120 in a vertical direction and an output based on irradiation by a green laser 112 or red/blue lasers 110.

FIG. 7 is a diagram for describing correction to irradiation timings of green laser 112 and red/blue lasers 110.

DESCRIPTION OF THE PREFERRED EMBODIMENTS

Figure 1:
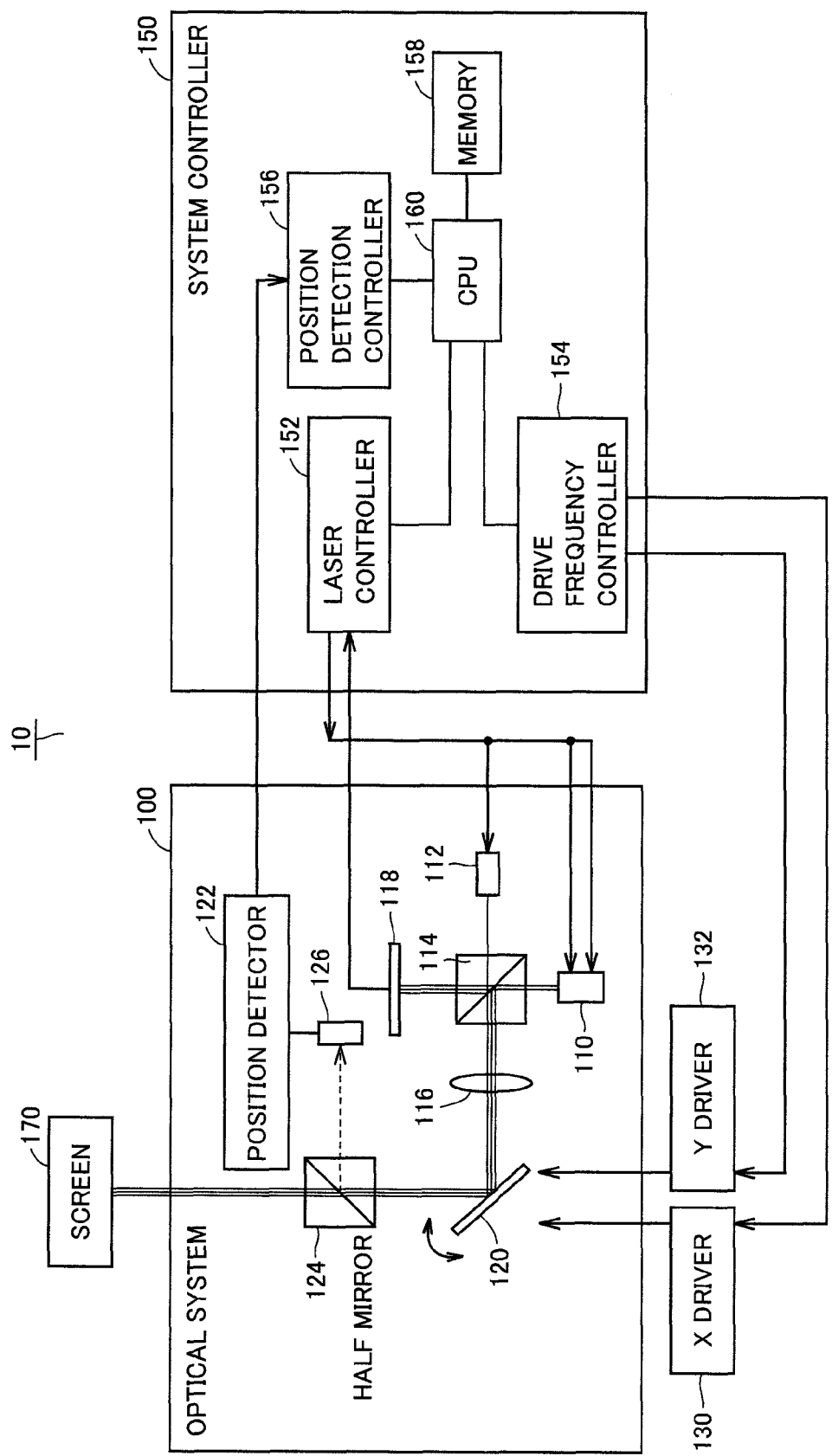
FIG. 1 is a block diagram that represents a hardware configuration of a laser projector 10 serving as a mode of an image display device according to an embodiment of the present invention.

An embodiment of the present invention will hereinafter be described with reference to the drawings. In the following description, the same parts are provided with the same reference characters, and have the same names and functions. Therefore, the detailed description thereof will not be repeated.

[Hardware Configuration]

With reference to FIG. 1, description will be made on an image display device according to an embodiment of the present invention. Laser projector 10 includes an optical system 100, a system controller 150, an X driver 130, and a Y driver 132.

Optical system 100 includes red/blue lasers 110, a green laser 112, a polarization beam splitter 114, a collimator lens 116, a scanner mirror 120, a half mirror 124, a photoreceptor 126, and a position detector 122. System controller 150 includes a laser controller 152, a drive frequency controller 154, a position detection controller 156, a memory 158, and a CPU (Central Processing Unit) 160. Laser projector 10 projects an image onto a screen 170 provided in front of optical system 100.

A red laser beam and a blue laser beam delivered by red/blue lasers 110 are reflected by polarization beam splitter 114, and the reflected lights are directed to collimator lens 116. A laser beam delivered by green laser 112 passes through polarization beam splitter 114 and is directed to collimator lens 116.

Scanner mirror 120 reflects the laser beams of respective colors, which have passed through collimator lens 116, toward a range predefined as a scan range. Scanner mirror 120 is driven by X driver 130 and Y driver 132 in a horizontal direction and a vertical direction, respectively.

Half mirror 124 allows a part of the laser beams reflected by scanner mirror 124 to pass therethrough, and reflects another part of the laser beams. The light reflected by half mirror 124 is received by photoreceptor 126. In contrast, the part of the laser beams that has passed through half mirror 124 is projected onto screen 170 via a lens (not shown).

Photoreceptor 126 is configured with, for example, a plurality of photodiodes. An output of photoreceptor 126 is inputted to position detector 122. Position detector 122 scans an output obtained from photoreceptor 126 in a horizontal direction and a vertical direction, and delivers data obtained through the scanning to system controller 150.

In system controller 150, CPU 160 is configured to control laser controller 152 and drive frequency controller 154 based on an output from position detection controller 156. Furthermore, CPU 160 stores in memory 158 positional information of scanner mirror 120, which has been calculated based on the output from position detection controller 156. The positional information includes, for example, a scan angle, a signal value outputted for providing the scan angle (e.g. a voltage value), and the like. Memory 158 is implemented as a non-volatile memory such as a flash memory in a certain aspect, or as a volatile memory in another aspect.

Laser controller 152 is configured to control red/blue lasers 10 and green laser 112 based on an output from CPU 160 and an output from a laser power detector 118. Further, laser controller 152 can deliver to CPU 160 an output obtained from laser power detector 118.

Drive frequency controller 154 is configured to control X driver 130 and Y driver 132 based on an output from CPU 160. More specifically, drive frequency band controller 154 delivers to X driver 130 a signal having a frequency that defines drive in a horizontal direction such that scanner mirror 120 is driven in the horizontal direction (hereinafter also referred to as a "horizontal drive signal"), in response to a command from CPU 160. Furthermore, drive frequency controller 154 delivers to Y driver 132 a signal having a frequency that defines drive in a vertical direction such that scanner mirror 120 is driven in the vertical direction (hereinafter also referred to as a "vertical drive signal"), in response to a command from CPU 160. Based on the horizontal drive signal, X driver 130 drives scanner mirror 120 in the horizontal direction. Based on the vertical drive signal, Y driver 132 drives scanner mirror 120 in the vertical direction.

Based on an output from position detector 122, position detection controller 156 A/D (Analog to Digital)-converts positional information of scanner mirror 120 (scan range), which is defined by the output of photoreceptor 126, and delivers the converted digital data to CPU 160. Based on the digital data, CPU 160 detects the position of scanner mirror 120, and in accordance with the detection result, controls laser controller 152 or drive frequency controller 154.

A vertical drive frequency and a horizontal drive frequency are predefined based on the size of scanner mirror 120, the scan direction, and drive characteristics of X driver 130 or Y driver 132. In a certain aspect, data that provides the vertical drive frequency and data that provides the horizontal drive frequency are stored in advance in memory 158.

In the present embodiment, a part or a whole of system controller 150 may also be implemented by a combination of hardware such as circuit elements. In another aspect, system controller 150 may also be implemented as a configuration that controls an operation of the hardware by software, by means of CPU 160 executing a program stored in memory 158.

Figure 2:
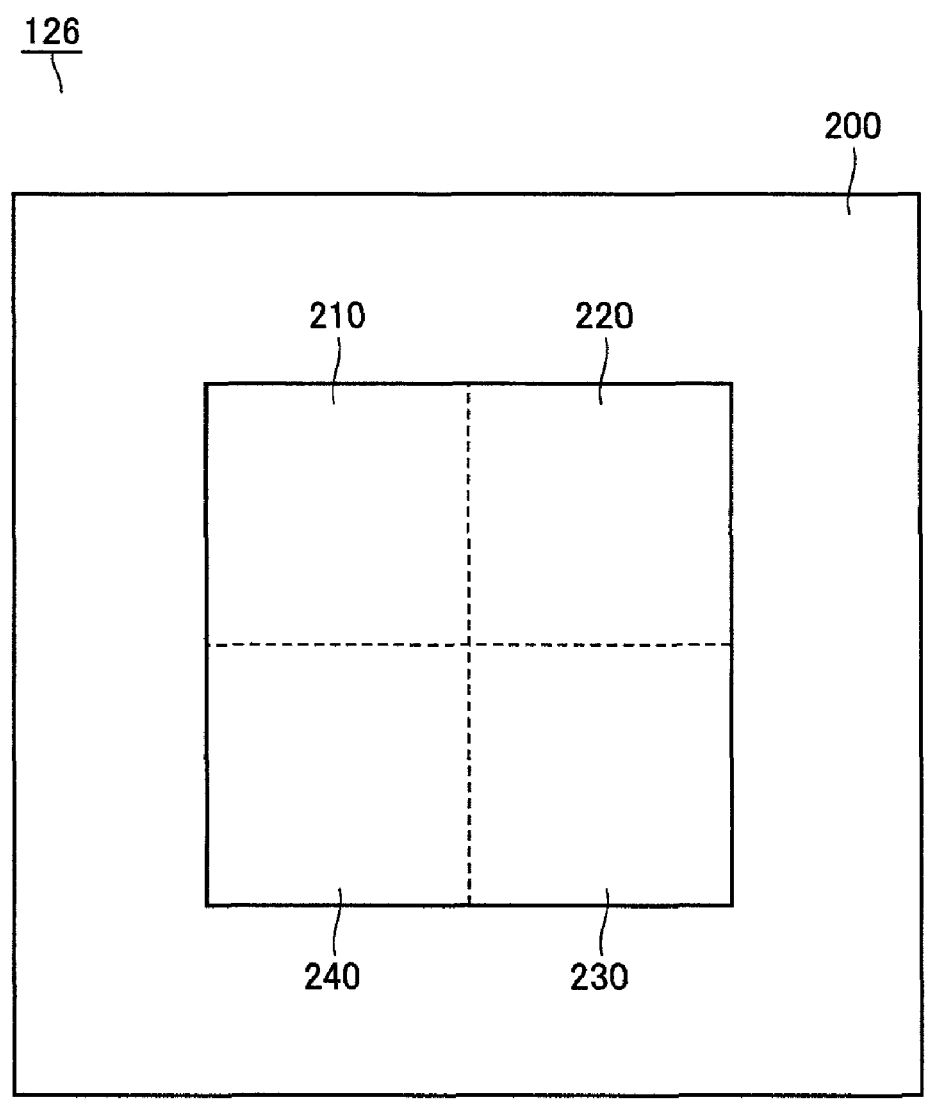
FIG. 2 is a diagram that schematically represents a light-receiving region in a photoreceptor 126 of an optical system 100.

With reference to FIG. 2, description will be made on a configuration of photoreceptor 126 that configures optical system 100 according to the present embodiment. FIG. 2 is a diagram that schematically represents a light-receiving region in photoreceptor 126. Photoreceptor 126 is configured with a plurality of light-receiving elements. Photoreceptor 126 includes a region for receiving a laser beam for projecting an image, and other regions. More specifically, photoreceptor 126 includes a peripheral region 200, which differs from a region for projecting an image, and regions 210, 220, 230, and 240 for projecting an image.

Portions of a laser beam reflected by scanner mirror 120 which correspond to light-receiving regions 210, 220, 230, and 240 are projected onto screen 170 as an image. Peripheral region 200 is defined as a region that does not relate to image projection, and is intended for switching a scan direction of scanner mirror 120.

In photoreceptor 126, a boundary between light-receiving regions 210, 240 and light-receiving regions 220, 230 is orthogonal to a horizontal scan direction of scanner mirror 120. Further, a boundary between light-receiving regions 210, 220 and light-receiving regions 230, 240 is defined to be parallel with a horizontal direction of scanner mirror 120.

In the example shown in FIG. 2, the light-receiving region is defined as four regions 210, 220, 230, and 240. However, the number of light-receiving regions is not limited to the one specified by FIG. 2. For example, three or more light-receiving regions may be defined in a horizontal direction, or three or more light-receiving regions may be defined in a vertical direction.

[Functional Configuration]

Figure 3:
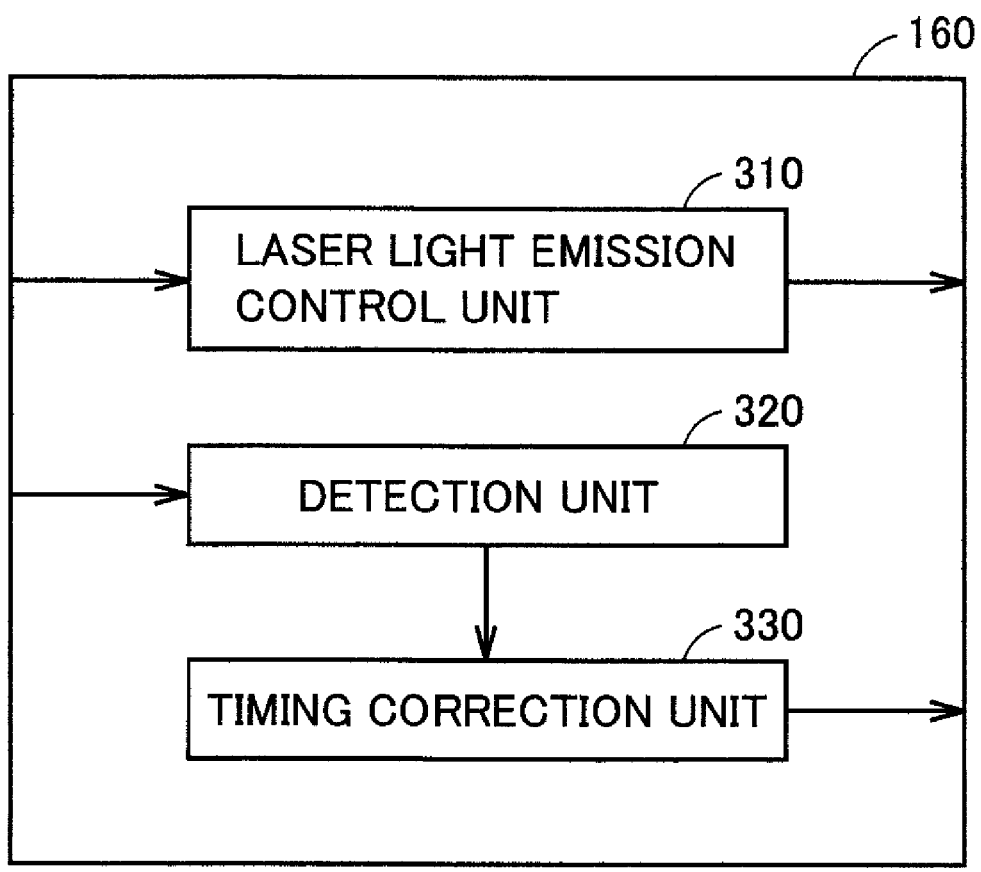
FIG. 3 is a block diagram that represents a configuration of functions implemented by a CPU 160 that implements laser projector 10.

With reference to FIG. 3, description will be made on a configuration of CPU 160 that implements laser projector 10 according to the present embodiment. FIG. 3 is a block diagram that represents a configuration of functions implemented by CPU 160. CPU 160 includes a laser light emission control unit 310, a detection unit 320, and a timing correction unit 330. These functions are implemented by CPU 160 executing an executable program stored in memory 158.

Laser light emission control unit 310 controls light emission and shut off of each of red/blue lasers 110 and green laser 112. In another aspect, laser light emission control unit 310 is configured to shut off a light-emitting first light source (e.g. a laser beam source of any color in red/blue lasers 110, or green laser 112) when sensing that a laser beam emitted from the first light source is received in light-receiving regions 210, 240 (hereinafter also referred to as a "first light-receiving region"). In this case, laser light emission control unit 310 allows the first light source to emit light again at an elapse of predetermined time from the shut off of the first light source. The predetermined time is defined as one piece of design information on laser projector 10. This time is defined in accordance with a scan speed of scanner mirror 120 and a size of the light-receiving region in photoreceptor 126.

In another aspect, when laser light emission control unit 310 senses that a laser beam emitted from a light-emitting second light source (e.g. a laser beam source different from a laser beam source corresponding to the above-described first light source) is received in light-receiving regions 210, 240, laser light emission control unit 310 terminates the light emission caused by the second light source. Furthermore, laser light emission control unit 310 allows the second light source to emit light again at an elapse of predetermined time from the shut off of the second light source.

Detection unit 320 detects a deviation between an optic axis of the first light source and an optic axis of the second light source, based on a timing at which a laser beam emitted from the first light source is received in light-receiving regions 220, 230 (hereinafter also referred to as a "second light-receiving region"), and a timing at which a laser beam emitted from the second light source is received in the second light-receiving region. Timing correction unit 330 corrects the light emission timing of a laser beam source corresponding to the second light source, based on the "deviation" detected by detection unit 320.

In another aspect, detection unit 320 includes a first calculation unit, a second calculation unit, and a third calculation unit. The first calculation unit calculates time that starts at a timing when reception of the laser beam emitted from a laser beam source serving as the first light source is sensed in the first light-receiving region (i.e. light-receiving regions 210, 240) and ends at a timing when the reception of the laser beam emitted from that laser beam source is sensed in the second light-receiving region (i.e. light-receiving regions 220, 230) (hereinafter also referred to as "first time").

The second calculation unit calculates time that starts when the laser beam emitted from the first light source is received in the first light-receiving region and ends when the laser beam emitted from another laser beam source corresponding to the "second light source" is received in the second light-receiving region (hereinafter also referred to as "second time"). For example, the second time is calculated as time between the timing at which reception of a laser beam of one color is sensed in one light-receiving region and the timing at which reception of a laser beam of another color is sensed in another light-receiving region.

The third calculation unit calculates a difference between the first time and the second time. Timing correction unit 330 corrects the light emission timing of a laser beam source corresponding to the second light source, based on the difference calculated by the third calculation unit.

In an aspect, the scan direction includes a direction along which scanner mirror 120 is driven horizontally. In another aspect, the scan direction includes a direction along which scanner mirror 120 is driven vertically.

In another aspect, detection unit 320 detects the above-described deviation when laser projector 10 is started up. In still another aspect, detection unit 320 may also detect the above-described deviation in response to an input of a correction instruction to laser projector 10. This input can be accepted, for example, via a switch provided at a housing of laser projector 10.

In a further aspect, memory 158 stores data representing the relation between a scan angle of scanner mirror 120 and a scan speed predetermined in accordance with the relevant scan angle. Timing correction unit 330 corrects the "deviation" detected by detection unit 320, based on the data.

[Control Structure]

Figure 4:
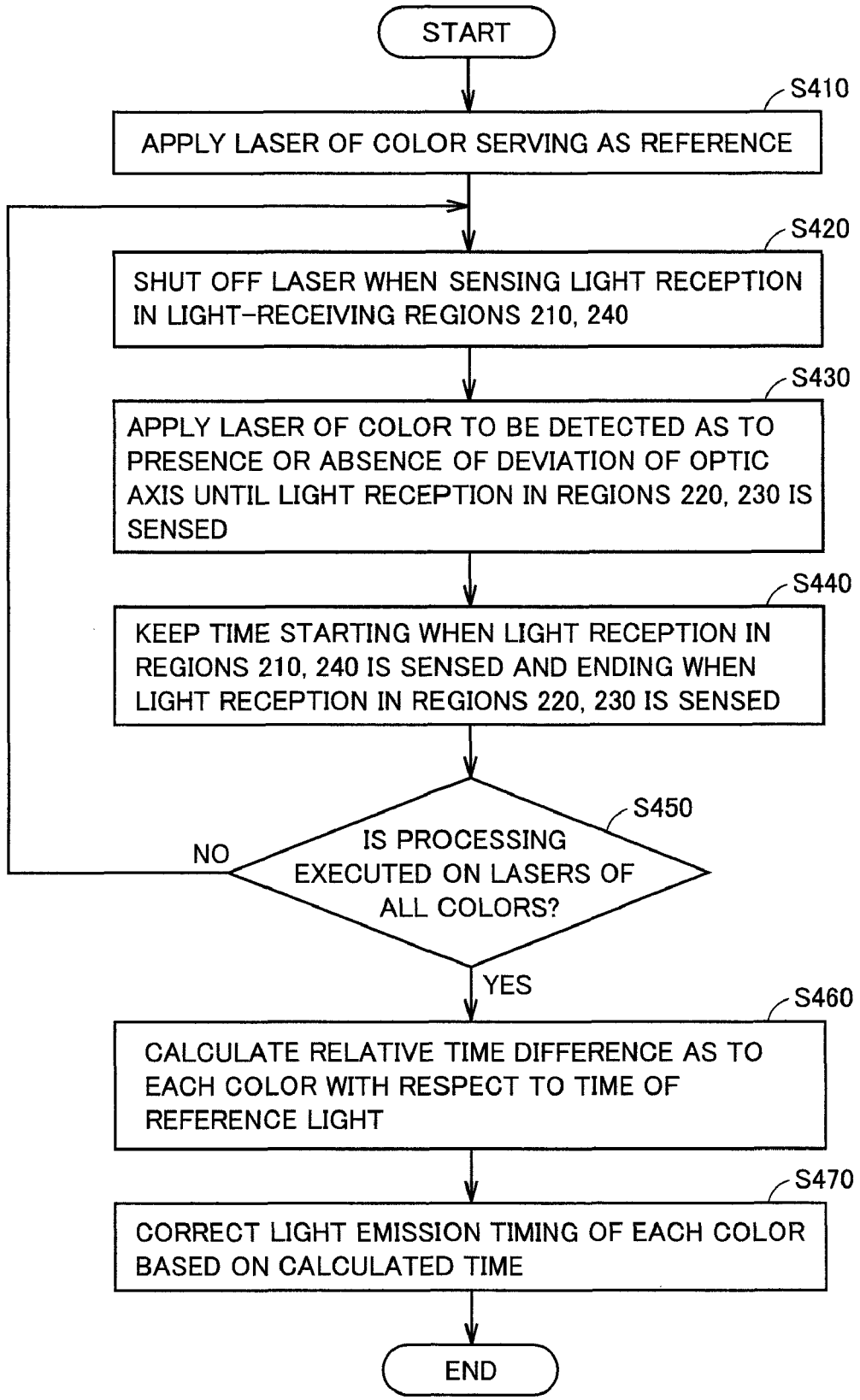
FIG. 4 is a flowchart that represents a part of a series of operations executed by CPU 160.

With reference to FIG. 4, description will be made on a control structure of laser projector 10 according to the present embodiment. FIG. 4 is a flowchart that represents a part of a series of operations executed by CPU 160 provided at laser projector 10.

In step S410, CPU 160 delivers a command to laser controller 152 to thereby command a laser beam source of any one color, out of the laser beam sources of three colors, to emit a laser beam. The laser beam source of any one color is used as a reference for detecting a deviation of an optic axis.

In step S420, when CPU 160 senses that the laser beam is received in light-receiving regions 210, 240 in photoreceptor 126, based on an output from position detection controller 156, CPU 160 causes the relevant laser to be shut off.

In step S430, CPU 160 causes a laser of a color, which is to be detected as to the presence or absence of a deviation of an optic axis, to be applied until the reception thereof is sensed in light-receiving regions 220, 230. The laser beam source lit at this time differs from the laser beam source lit in step S410.

In step S440, CPU 160 keeps time that starts when light reception is sensed in light-receiving regions 210, 240 and ends when light reception is sensed in light-receiving regions 220, 230.

In step S450, CPU 160 determines whether or not the lasers of all colors, namely, red, blue and green, have been lit and shut off. For example, whenever CPU 160 delivers to laser controller 152 a command to allow a laser of any color to be emitted, CPU 160 sets a flag indicating that a laser beam of the relevant color has been lit. CPU 160 determines whether or not the lasers of all colors have been lit and shut off, based on a set state of the flags. If CPU 160 determines that the lasers of all colors have been lit and shut off (YES in step S450), CPU 160 switches the control to step S460. If not so (NO in step S450), CPU 160 returns the control to step S420, and allows a laser beam source of another color to be lit and shut off.

In step S460, CPU 160 calculates a relative time difference as to each color with respect to the reference color.

In step S470, CPU 160 corrects the light emission timing of the laser beam source of each color, based on the time calculated in step S460. More specifically, CPU 160 delivers to drive frequency controller 154 a command in which a light emission timing is corrected. Drive frequency controller 154 drives X driver 130 or Y driver 132 based on the command in which the light emission timing is corrected.

[Detection of a Deviation of an Optic Axis in a Horizontal Direction]

Figure 5:
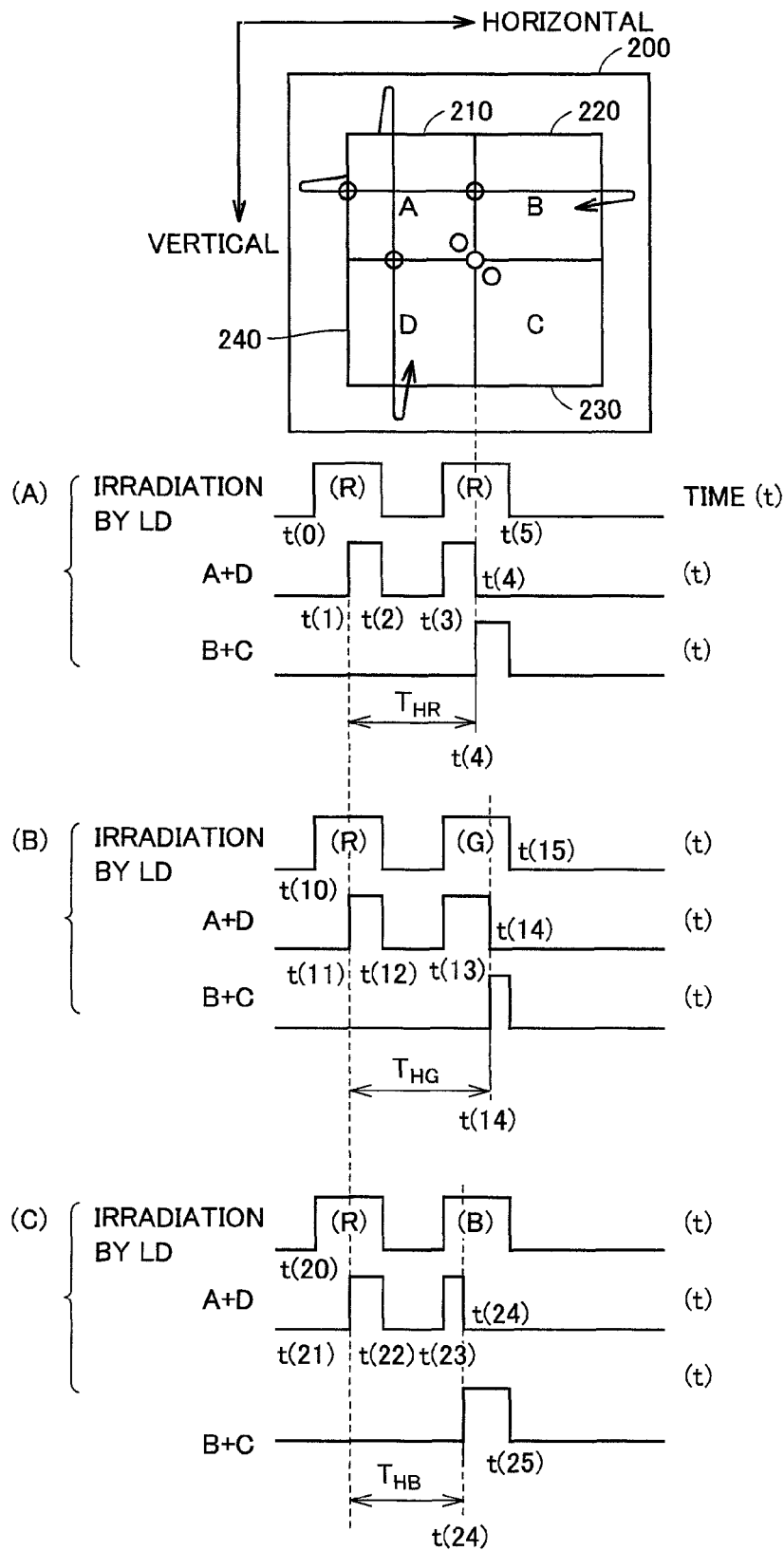
FIG. 5 is a diagram that represents the relation between a timing of each of light emission and light-up of a laser of each color and an output of photoreceptor 126.

With reference to FIG. 5, description will be made on a deviation of an optic axis of a laser beam source in laser projector 10 in a horizontal direction. FIG. 5 is a diagram that represents the relation between a timing of each of light emission and light-up of a laser of each color and an output of photoreceptor 126. As an example, description will be made on the case that a red laser beam source in red/blue lasers 110 is used as a reference laser beam source. However, a laser beam of another color may also be used.

In FIG. 5, with reference to graph (A), a red laser beam source in red/blue lasers 110 performs irradiation based on a command from laser controller 152. Specifically, the red laser beam source is lit at time point t(0) (a sign of "R"). When the light reflected from half mirror 124 reaches the first light-receiving region (light-receiving regions 210, 240) by the drive of scanner mirror 120 in a horizontal direction, the laser beam from the red laser beam source is received in light-receiving regions 210, 240 at time point t(1) (see timing chart A+D).

At time point t(2), the red laser beam source is shut off based on a command from laser controller 152. As a result, no laser beam is received in light-receiving regions 210, 240 after time point t(2) (see timing chart A+D).

Subsequently, at time point t(3), the red laser beam source is lit again based on a command from laser controller 152. An output from the first light-receiving region appears again (see timing chart A+D). Note that time from time point t(2) to time point t(3) is predefined as design information, based on a width of the first light-receiving region and a scan speed of scanner mirror 120. When scanner mirror 120 scans in a horizontal direction while the red laser beam source is being lit, the sensing of light reception in light-receiving regions 210, 240 continues from time point t(3) to time point t(4).

At time point t(4), an output of the laser beam in photoreceptor 126 is sensed as light reception in light-receiving regions 220, 230 (see timing chart B+C). At time point t(5), the red laser beam source is shut off in accordance with a command from laser controller 152. As a result, the output from light-receiving regions 220, 230 also disappears (see timing chart B+C).

CPU 160 calculates a difference between the timing (time point t(1)) at which light reception in light-receiving regions 210, 240 is sensed, and the timing (time point t(4)) at which reception of the laser beam in light-receiving regions 220, 230 is sensed, as reference time $T_{HR}$. Reference time $T_{HR}$ is used for comparison with corresponding time of a laser beam of another color.

In FIG. 5, with reference to graph (B), after the red laser beam source selected as a reference laser beam source is lit and shut off, similar processing is executed on the laser beam sources of other colors. For example, processing for detecting a deviation of an optic axis of green laser 112 is initiated.

More specifically, laser controller 152 initially provides a command to the red laser beam source and allows it to be lit at time point t(10) and shut off at time point t(12). In this case, an output from light-receiving regions 210, 240 continues from time point t(11) to time point t(12) (timing chart A+D).

At time point t(13), laser controller 152 provides a command to green laser 112 and allows it to be lit. The light-up of green laser 112 continues from time point t(13) to time point t(15). Reception of the green laser beam in light-receiving regions 210, 240 is sensed from time point t(13). When scanner mirror 120 is kept driven in a horizontal direction, an output indicating the reception of the laser beam from green laser 112 is switched at time point t(14) from light-receiving regions 210, 240 (timing chart A+D) to light-receiving regions 220, 230 (timing chart B+C).

CPU 160 calculates time that starts at the light emission timing (time point t(10)) of the reference laser beam source (the red laser beam source) and ends at time point t(14), as determination target time $T_{HG}$. CPU 160 compares determination target time $T_{HG}$ with reference time $T_{HR}$, and determines the presence or absence of the difference therebetween.

In FIG. 5, with reference to graph (C), laser controller 152 executes processing for detecting a deviation of an optic axis of a laser beam source of still another color. For example, laser controller 152 provides a command to a blue laser beam source in red/blue lasers 110.

More specifically, laser controller 152 allows the red laser beam source to be lit at time point t(20). When scanner mirror 120 is kept driven in a horizontal direction, an output indicating the reception of the red laser beam in light-receiving regions 210, 240 appears at time point t(21) (timing chart A+D). Subsequently, at time point t(22), laser controller 152 allows the red laser beam source to be shut off. The output from light-receiving regions 210, 240 disappears (see timing chart A+D).

At time point t(23), laser controller 152 allows the blue laser beam source in red/blue lasers 110 to be lit. The light-up of the blue laser beam source continues until time point t(25). The reception of the blue laser beam in light-receiving regions 210, 240 continues, for example, from time point t(23) to time point t(24). After time point t(24), the reception of the blue laser beam is sensed as an output from the second light-receiving region.

CPU 160 calculates a difference between time point t(21) and time point t(24) as determination target time $T_{HB}$. CPU 160 compares the calculated determination target time $T_{HB}$ with reference time $T_{HR}$, and determines the presence or absence of a deviation of an optic axis of the blue laser beam source.

[Detection of a Deviation of an Optic Axis in a Vertical Direction]

With reference to FIG. 6, description will be made on detection of the presence or absence of a deviation of an optic axis in a vertical direction in optical system 100. FIG. 6 is a diagram that represents the relation between drive of scanner mirror 120 in a vertical direction and an output based on irradiation by a green laser 112 and red/blue lasers 110. The red laser beam source in red/blue lasers 110 is used as a reference.

In FIG. 6, with reference to graph (A), the drive of scanner mirror 120 is started at time point t(30) based on a command from Y driver 132, and scanner mirror 120 is vertically driven until time point t(35). Scanner mirror 120 is returned to the initial position between time point t(35) and time point t(36).

With reference to graph (B), the red laser beam source is lit based on a command from laser controller 152 at time point t(31). The output of the red laser beam continues from time point t(31) to time point t(34).

The light reflected from half mirror 124 is directed to light-receiving regions 210, 220, and at time point t(32), directed to light-receiving regions 230, 240 (second light-receiving region). Accordingly, the output from light-receiving regions 230, 240 starts at time point t(32). At time point t(33), when the light reflected from half mirror 124 deviates from light-receiving regions 230, 240, the output in light-receiving regions 230, 240 is terminated (see timing chart C+D). Subsequently, at time point t(34), the red laser beam source terminates irradiation of the laser beam based on a command from laser controller 152.

CPU 160 calculates reference time $T_{VR}$ from time point t(31) to time point t(32), as reference time. Reference time $T_{VR}$ is used for determining the presence or absence of a deviation of an optic axis of the laser beam of another color.

With reference to graph (C), at time point t(41), laser controller 152 allows green laser 112 to be lit (see LD irradiation (G)). When scanner mirror 120 is driven in a vertical direction, the light reception in light-receiving regions 230, 240 is sensed at time point t(42). The light reception in light-receiving regions 230, 240 continues from time point t(42) to time point t(43). At time point t(44), laser controller 152 terminates the light-up caused by green laser 112. CPU 160 calculates a difference between time point t(41) and time point t(42) as determination target time $T_{VG}$.

With reference to graph (D), at time point t(51), laser controller 152 allows the blue laser beam source in red/blue lasers 110 to be lit (see LD irradiation (B)). When scanner mirror 120 is driven in a vertical direction, the light reception in light-receiving regions 230, 240 is sensed at time point t(52). The light reception in light-receiving regions 230, 240 continues from time point t(52) to time point t(53). At time point t(54), laser controller 152 terminates the light-up caused by the blue laser beam source. CPU 160 calculates a difference between time point t(51) and time point t(52) as determination target time $T_{VB}$.

[Correction to the Timing]

With reference to FIG. 7, description will be made on the correction to irradiation timings of green laser 112 and red/blue lasers 110. In FIG. 7, timing chart (A) represents a timing at which laser controller 152 provides a command to emit light to a light source of any of the colors selected as a reference color. Specifically, the red laser beam source is selected as a reference laser beam source. A laser beam source of another color may also be selected.

The red laser beam source is applied from time point t(60) to time point t(61), from time point t(62) to time point(63), from time point t(64) to time point t(65), and from time point t(66) to time point t(67), so as to determine the presence or absence of a deviation of an optic axis.

With reference to timing chart (B), the red laser beam is lit based on the command from laser controller 152, at the same interval as the interval between the starts of irradiation defined in timing chart (A).

With reference to timing chart (C), green laser 112 is lit in accordance with a corrected timing calculated based on the examples shown in FIGS. 5 and 6. Specifically, green laser 112 is lit at time point t(71). Time point t(71) is delayed with respect to time point t(60) at which the red laser is lit, by corrected time $(T_{VG}-T_{VR})+(T_{HG}-T_{HR})$.

With reference to timing chart (D), the blue laser source in red/blue lasers 110 is lit in accordance with the corrected timing calculated based on the examples shown in FIGS. 5 and 6. Specifically, the blue laser beam source is lit at time point t(81). Time point t(81) is advanced with respect to time point t(60) at which the red laser is lit, by corrected time $(T_{VB}-T_{VR})+(T_{HB}-T_{HR})$.

Effects of the Embodiment

As described above, laser projector 10 according to the embodiment of the present invention detects the presence or absence of a deviation of an optic axis of a light source of each of the colors of R, G and B at start-up, and based on the detection results, corrects the emission timing of a laser beam to be emitted from the light source in which a deviation is detected.

Before projecting an image, laser projector 10 drives scanner mirror 120 in a horizontal direction or a vertical direction, while applying a laser beam of a single specific color. The laser beam is received in the two light-receiving regions in photoreceptor 126, the two light-receiving regions being defined by a boundary orthogonal to the moving direction of scanner mirror 120. Laser projector 10 calculates each output time from each of the light-receiving regions, each output time being based on the emission of the laser beam of the single specific color.

Subsequently, laser projector 10 applies laser beams of other colors one by one, and drives scanner mirror 120 in the same direction. Laser projector 10 calculates each output time from each of the light-receiving regions, each output time being based on the emission of the laser beam of the single color, as to each of the colors.

Laser projector 10 further calculates a difference between the time calculated as to the single specific color and the time calculated as to one of the other colors, so as to check whether or not there is a difference. The existence of the difference means that the emission timing of that color deviates, so that laser projector 10 corrects the deviation. For example, laser projector 10 calculates the time to be corrected, based on the time calculated as a difference and a movement speed of scanner mirror 120.

For example, if the interval between when the reception in one light-receiving region is sensed and when the reception in another light-receiving region is sensed, as to the color to be compared, is shorter than the corresponding interval as to the specific color serving as a reference, laser projector 10 makes a correction to delay the irradiation timing of the laser beam. In contrast, if the interval between when the reception in one light-receiving region is sensed and when the reception in another light-receiving region is sensed, as to the color to be compared, is longer than the corresponding interval as to the specific color serving as a reference, laser projector 10 makes a correction to advance the irradiation timing of the laser beam. By doing so, the optic axes of respective laser beam sources coincide with one another when an image is projected, so that each of the colors is accurately reproduced. Consequently, adjustment of the optic axes can readily be achieved without an increase in number of components.

Although the timing of correction is set at the start-up of laser projector 10, the timing is not limited thereto. For example, the switch that accepts an instruction of adjustment is provided at a housing of laser projector 10, and a deviation of the optic axes may be corrected in response to a manipulation on the relevant switch. Alternatively, the correction may also be made at a timing at which the data to be projected is inputted to laser projector 10.

<Modification>

Figure 8A:
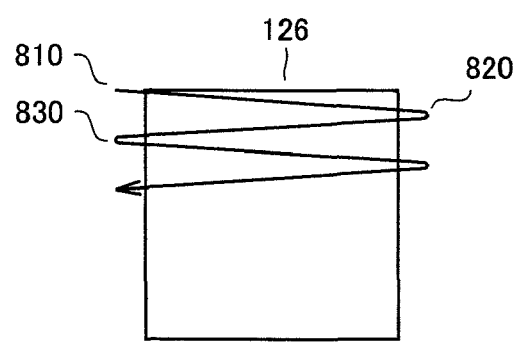
FIG. 8A and FIG. 8B are a diagram that represents a pattern of drive of scanner mirror 120 in a horizontal direction, and a diagram that represents the relation between a scan angle and a scan speed in a light-receiving region, respectively.
Figure 8B:
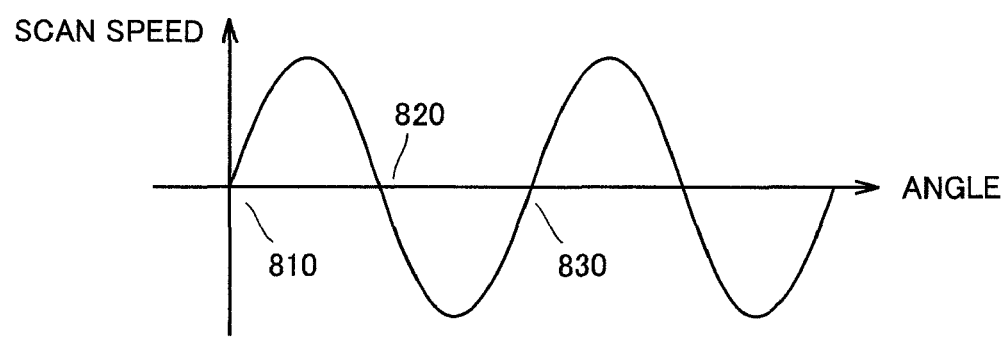

With reference to FIG. 8A and FIG. 8B, description will be made on a modification of the present embodiment. Scanner mirror 120 has a scan speed that varies depending on a scan angle, and hence laser projector 10 according to the present modification may have a configuration in which a lookup table of a scan speed of scanner mirror 120 is included and CPU 160 corrects the detected time difference by referring to the table. It is noted that laser projector 10 according to the present modification has a hardware configuration similar to that of laser projector 10 shown in FIG. 1, and has the same functions. Accordingly, the detailed description of the hardware configuration is not repeated.

FIG. 8A is a diagram that shows a pattern of the drive of scanner mirror 120 in a horizontal direction. FIG. 8B is a diagram that shows the relation between a scan angle and a scan speed at each location shown in FIG. 8A.

More specifically, when scanner mirror 120 is positioned at opposite ends of the scan range in the horizontal direction (specifically, at locations 810, 820, and 830), the scan speed is 0. In contrast, in proximity to the center of photoreceptor 126 in the horizontal direction, the scan speed of scanner mirror 120 has local maximum. Therefore, the timing at which each of the laser beams is lit for correcting a deviation of the optic axes may be calculated based on the relation between the scan angle and the scan speed as shown in FIG. 8B (e.g. the relation expressed as a sine curve). Such a relation is retained in memory 158, for example, as a mapped data table or a function.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A device for displaying an image, comprising:
    a first light source for emitting first light;
    a second light source for emitting second light, a color of said first light differing from a color of said second light;
    a mirror for reflecting said first light and said second light;
    an actuator configured to drive said mirror in a scan direction;
    a photoreceptor for receiving said first light and said second light, said photoreceptor including a first light-receiving region and a second light-receiving region, and a boundary between said first light-receiving region and said second light-receiving region being orthogonal to said scan direction;
    a controller configured to control light emission and shut off of said first light source, and light emission and shut off of said second light source;
    a detector configured to detect a deviation between an optic axis of said first light source and an optic axis of said second light source, based on a timing at which said first light is received in said second light-receiving region and a timing at which said second light is received in said second light-receiving region; and
    a corrector configured to correct a light emission timing of said second light source based on the deviation detected by said detector.

2. The device according to claim 1, wherein
    said detector includes
    a first calculation circuit configured to calculate first time starting at reception of said first light in said first light-receiving region and ending at reception of said first light in said second light-receiving region,
    a second calculation circuit configured to calculate second time starting at reception of said first light in said first light-receiving region and ending at reception of said second light in said second light-receiving region, and
    a third calculation circuit configured to calculate a difference between said first time and said second time, and
    said corrector is configured to correct the light emission timing of said second light source based on said calculated difference.

3. The device according to claim 1, wherein said controller is configured to:
    shut off said first light source when sensing that light emitted from said first light source which is emitting light is received in said first light-receiving region, and
    allow said first light source to emit light at an elapse of predetermined time from the shut off of said first light source.

4. The device according to claim 1, wherein said controller is configured to:
    shut off said second light source when sensing that light emitted from said second light source which is emitting light is received in said first light-receiving region, and
    allow said second light source to emit light at an elapse of predetermined time from the shut off of said second light source.

5. The device according to claim 1, wherein said scan direction includes a direction along which said mirror is horizontally driven.

6. The device according to claim 1, wherein said scan direction includes a direction along which said mirror is vertically driven.

7. The device according to claim 1, wherein said detector is configured to detect said deviation when said device is started up.

8. The device according to claim 1, further comprising a memory for storing data indicating a relation between a scan angle of said mirror and a scan speed defined in accordance with said scan angle, wherein
    said corrector is configured to correct said deviation based on said data.

9. A method for displaying an image, comprising the steps of:
    emitting first light;
    emitting second light, a color of said first light differing from a color of said second light;
    reflecting said first light and said second light at a mirror;
    driving said mirror in a scan direction;
    receiving said first light and said second light, a region for receiving including a first light-receiving region and a second light-receiving region, and a boundary between said first light-receiving region and said second light-receiving region being orthogonal to said scan direction;
    controlling light emission and shut off of a source of said first light, and light emission and shut off of a source of said second light;
    detecting a deviation between an optic axis of the source of said first light and an optic axis of the source of said second light, based on a timing at which said first light is received in said second light-receiving region and a timing at which said second light is received in said second light-receiving region; and
    correcting a light emission timing of said second light based on said detected deviation.

10. The method according to claim 9, wherein
    said step of detecting includes the steps of:
    calculating first time starting at reception of said first light in said first light-receiving region and ending at reception of said first light in said second light-receiving region,
    calculating second time starting at reception of said first light in said first light-receiving region and ending at reception of said second light in said second light-receiving region, and
    calculating a difference between said first time and said second time, and
    said method further comprises the step of correcting the light emission timing of the source of said second light based on said calculated difference.

11. The method according to claim 9, wherein said step of controlling includes the steps of:
    shutting off said first light source when sensing that light emitted from said first light source which is emitting light is received in said first light-receiving region, and
    allowing said first light source to emit light at an elapse of predetermined time from the shut off of said first light source.

12. The method according to claim 9, wherein said step of controlling includes the steps of:

shutting off said second light source when sensing that light emitted from said second light source which is emitting light is received in said first light-receiving region, and allowing said second light source to emit light at an elapse of predetermined time from the shut off of said second light source.

13. The method according to claim 9, wherein said scan direction includes a direction along which said mirror is horizontally driven.

14. The method according to claim 9, wherein said scan direction includes a direction along which said mirror is vertically driven.

15. The method according to claim 9, wherein said step of detecting includes the step of detecting said deviation when a device for displaying an image is started up.

16. The method according to claim 9, further comprising the step of loading data indicating a relation between a scan angle of said mirror and a scan speed defined in accordance with said scan angle into a memory, wherein said step of correcting includes the step of correcting said deviation based on said data.

* * * * *